W. A. DAVIS.
Car Truck.
No. 963.
Patented Oct. 5, 1838.
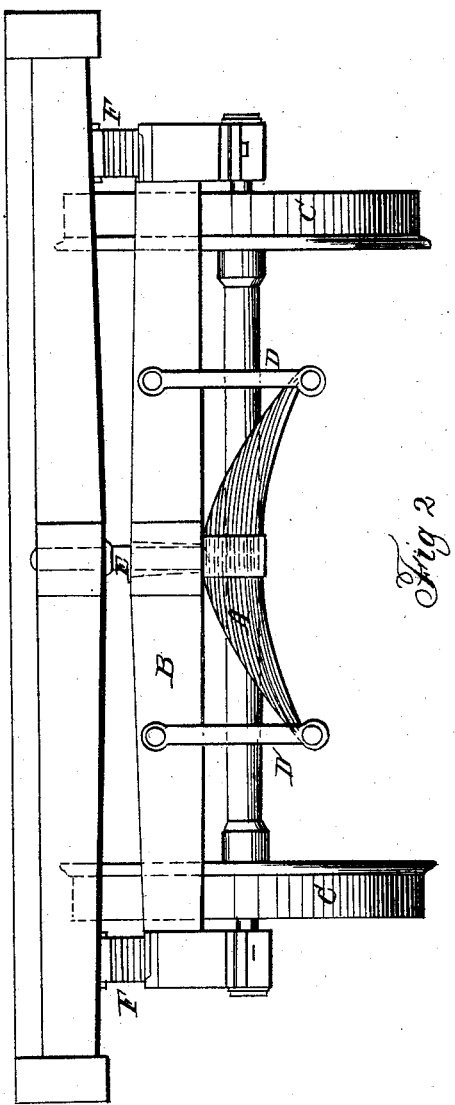
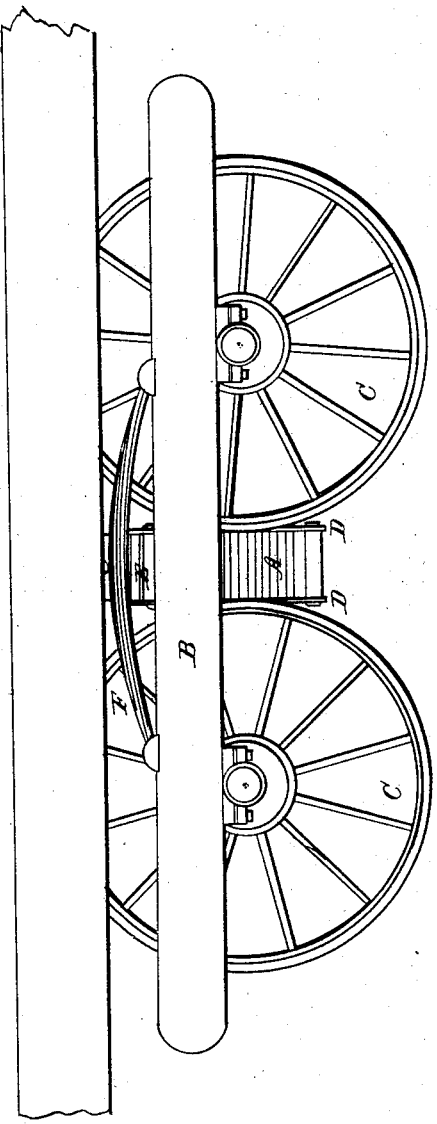

UNITED STATES PATENT OFFICE.

WM. A. DAVIS, OF BALTIMORE, MARYLAND.

CONSTRUCTION OF RAILROAD-CARS.

Specification of Letters Patent No. 963, dated October 5, 1838.

*To all whom it may concern:*

Be it known that I, WILLIAM A. DAVIS, of the city of Baltimore and State of Maryland, have invented a new and useful Improvement in the Construction of Cars for Railroads, which is described as follows, reference being had to the annexed drawings of the same, making part of this specification.

The nature of my invention consists in a certain arrangement of a spring below the truck in the center of the car for sustaining the whole, or part of the weight of the upper gear, body, and load, and two other springs—one on each side of the car between the truck and upper gear or body to keep the car in an upright position.

The main spring A Figure 1 is placed below the truck B transversely, and equidistant between the car wheels C or in the center of the car, suspended by links D, D, D, D, hung from the truck two at each end of the spring in such a manner that as the spring is straightened by the weight of the hanging body and load thereon its ends are allowed to extend themselves to the right and left by means of the links hanging loosely from the bolts inserted into the truck.

The gear, car body, and load rest upon the convex surface of the spring in the center thereof by means of a strong bolt E one end of which being inserted into the gear and secured by flanges, screws, or otherwise, said bolt extending downward and passing through the truck rests with its point upon the center of the convex surface of the spring.

The two side springs F F are for keeping the body in a horizontal position and are placed longitudinally with the trucks one on each side having their ends inserted into pockets fastened on top of the trucks. As the body rocks from one side to the other the under side of the gear strikes against said side springs which restore it to a horizontal position.

There is one main spring and two side springs for each truck constructed and arranged in a similar manner to those before described.

The invention claimed and desired to be secured by Letters Patent consists—

1. In the arrangement of the main springs under the trucks in the center of car and suspending the same by links from said trucks, upon which springs the whole load, body, and gear are sustained by bolts projecting from the gear passing through the trucks and resting upon the convex surfaces of said springs in the manner before described.

2. Also in the arrangement of the side springs on top of the trucks for sustaining the car body in an upright position in combination with the main spring or springs.

WILLIAM A. DAVIS.

Witnesses:
WM. P. ELLIOTT,
EDMUND MAHER.